United States Patent
Salamah et al.

(10) Patent No.: US 7,893,576 B2
(45) Date of Patent: Feb. 22, 2011

(54) GENERATOR COIL COOLING BAFFLES

(75) Inventors: Samir Armando Salamah, Niskayuna, NY (US); Eric Steven Buskirk, Guilderland, NY (US); Binu Mathew Moonjanattu, Bangalore (IN); Prashant Prakash Pimpalkar, Belgaum (IN); Rebinth Jose Robin, Bangalore (IN); Devon Walter Story, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/435,586

(22) Filed: May 5, 2009

(65) Prior Publication Data

US 2010/0283335 A1    Nov. 11, 2010

(51) Int. Cl.
H02K 1/32    (2006.01)

(52) U.S. Cl. .......................... 310/61; 310/52

(58) Field of Classification Search ............. 310/52–59, 310/61–63, 60 A
See application file for complete search history.

(56) References Cited

U.S. PATENT DOCUMENTS

| | | |
|---|---|---|
| 3,765,480 A | 10/1973 | Fries |
| 3,882,335 A | 5/1975 | Fries |
| 3,995,180 A | 11/1976 | Giles |
| 4,547,688 A | 10/1985 | Hammer et al. |
| 4,900,956 A | 2/1990 | Gavilondo et al. |
| 4,922,147 A * | 5/1990 | Sismour et al. ................ 310/61 |
| 5,633,543 A * | 5/1997 | Jarczynski et al. ............. 310/59 |
| 5,652,469 A * | 7/1997 | Boardman et al. ............. 310/58 |
| 5,894,178 A * | 4/1999 | Stefan .......................... 310/61 |
| 6,204,580 B1 * | 3/2001 | Kazmierczak ................ 310/52 |
| 6,252,318 B1 * | 6/2001 | Kazmierczak ................ 310/61 |
| 6,956,313 B2 | 10/2005 | El-Gabry et al. |
| 6,965,185 B1 | 11/2005 | Kaminski et al. |
| 7,146,707 B2 * | 12/2006 | Tornquist et al. .............. 29/598 |
| 7,190,094 B2 * | 3/2007 | Mayor .......................... 310/61 |
| 7,462,962 B2 * | 12/2008 | De Bock et al. ............... 310/58 |

FOREIGN PATENT DOCUMENTS

| | | |
|---|---|---|
| EP | 1976095 A | 10/2008 |
| EP | 2031733 A2 | 3/2009 |
| EP | 2180578 A2 | 4/2010 |
| JP | 04255442 A | 9/1992 |
| JP | 10014148 A | 1/1998 |
| JP | 11146587 A | 5/1999 |
| JP | 2010104202 A | 5/2010 |

OTHER PUBLICATIONS

GB 1007170.2, Great Britain Search Report and Written Opinion, Aug. 25, 2010.

* cited by examiner

*Primary Examiner*—Thanh Lam
(74) *Attorney, Agent, or Firm*—Hoffman Warnick LLC; Ernest G. Cusick (57) ABSTRACT

Systems are disclosed that assist in cooling generator rotor coils. In one embodiment, the system includes a stator; a rotor positioned within the stator, the rotor having: a spindle; groups of coils disposed about the spindle, each of the groups of coils including a plurality of ducts; a plurality of subslots disposed about the spindle, each of the plurality of subslots extending between the spindle and one of the groups of coils, wherein each of the plurality of subslots is in fluid communication with the one of the groups of coils; and a first baffle disposed in one of the plurality of subslots for directing a coolant into at least one of the plurality of ducts.

20 Claims, 8 Drawing Sheets

GENERATOR COIL COOLING BAFFLES

BACKGROUND OF THE INVENTION

The subject matter disclosed herein relates to generator coil cooling baffles. More specifically, the subject matter disclosed herein relates to generator coil cooling baffles within a generator rotor.

Dynamoelectric machines such as electrical generators conventionally include a rotor and a stator. The rotor is conventionally provided with field windings (rotor coils) that excite the generator while receiving current from an excitation source. The stator is provided with windings from which electrical power is output. During operation, electrical current traveling through rotor coils generates heat. If this heat is not conducted away from the rotor coils, it may cause diminished performance of the generator.

BRIEF DESCRIPTION OF THE INVENTION

Systems are disclosed that assist in cooling generator rotor coils. In one embodiment, the system includes a stator; a rotor positioned within the stator, the rotor having: a spindle; groups of coils disposed about the spindle, each of the groups of coils including a plurality of ducts; a plurality of subslots disposed about the spindle, each of the plurality of subslots extending between the spindle and one of the groups of coils, wherein each of the plurality of subslots is in fluid communication with the one of the groups of coils; and a first baffle disposed in one of the plurality of subslots for directing a coolant into at least one of the plurality of ducts.

A first aspect of the invention provides a dynamoelectric machine comprising: a stator; a rotor positioned within the stator, the rotor having: a spindle; groups of coils disposed about the spindle, each of the groups of coils including a plurality of ducts; a plurality of subslots disposed about the spindle, each of the plurality of subslots extending between the spindle and one of the groups of coils, wherein each of the plurality of subslots is in fluid communication with the one of the groups of coils; and a first baffle disposed in one of the plurality of subslots for directing a coolant into at least one of the plurality of ducts.

A second aspect of the invention provides a rotor comprising: a spindle; groups of coils disposed about the spindle, each of the groups of coils including a plurality of ducts; a plurality of subslots disposed about the spindle, each of the plurality of subslots extending between the spindle and one of the groups of coils, wherein each of the plurality of subslots is in fluid communication with the one of the groups of coils; and a first baffle disposed in one of the plurality of subslots for directing a coolant into at least one of the plurality of ducts.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
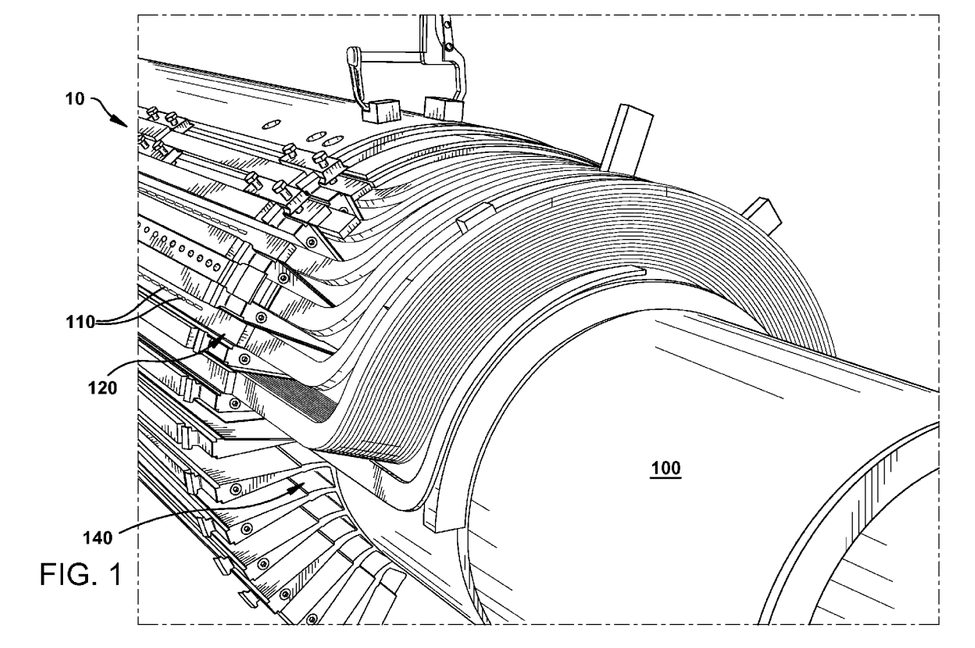
FIG. 1 shows a three-dimensional perspective view of a portion of a generator rotor according to embodiments of the invention.

As indicated above, aspects of the invention provide generator coil cooling baffles. FIGS. 1-8 show different aspects of a generator, and specifically, configurations providing for cooling of generator coils 120. FIG. 1 shows a three-dimensional perspective view of a portion of a rotor 10. Rotor 10 may include a spindle 100 and groups of coils 120 disposed about spindle 100. Each group of coils 120 may include a plurality of ducts 110. Further, rotor 10 may include a plurality of subslots 140 disposed about spindle 100. Each subslot 140 may extend between spindle 100 and group of coils 120 and may be in fluid communication with group of coils 120. Further aspects of the generator and rotor 10 will be described with reference to FIGS. 2-8.

Figure 2:
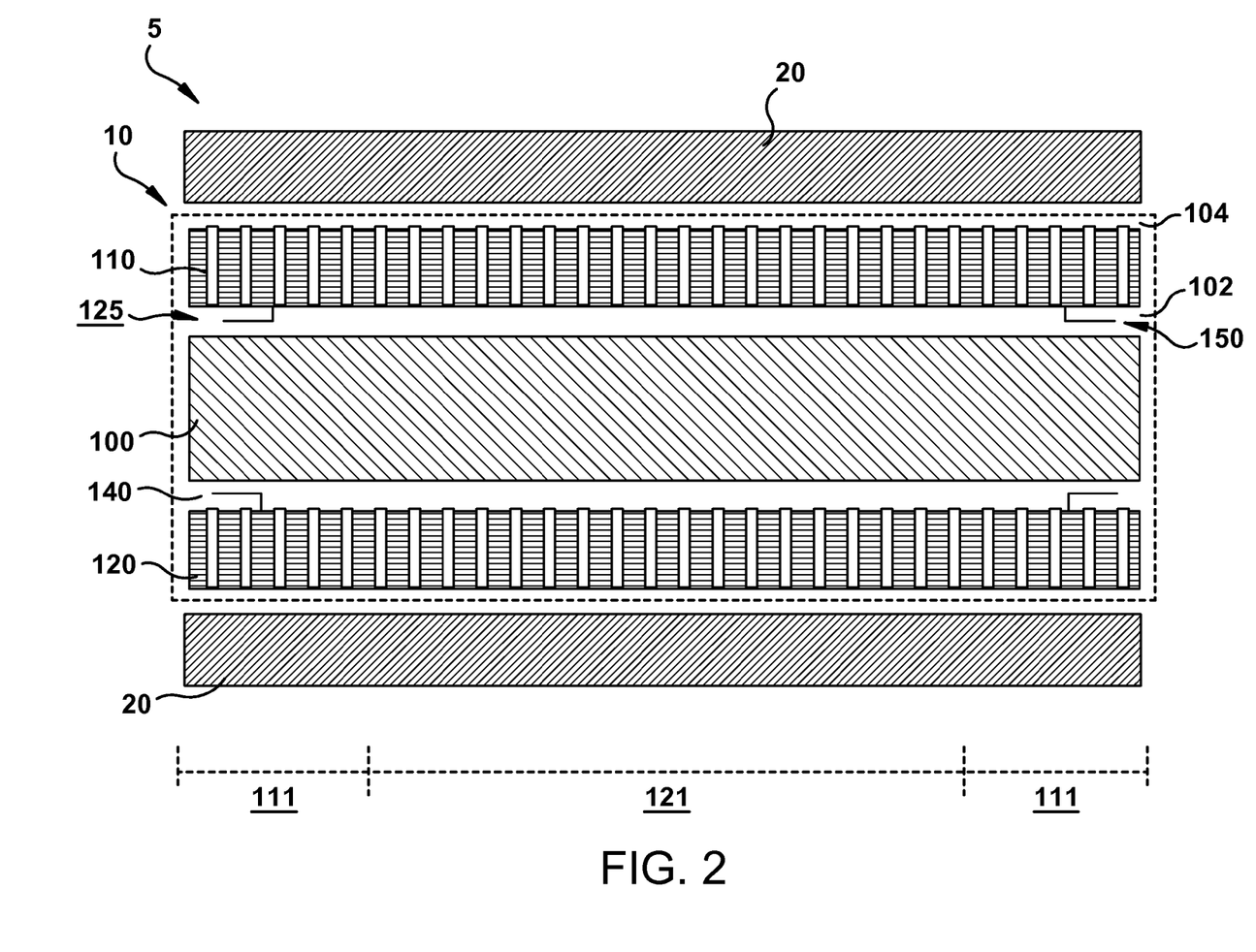
FIG. 2 shows a cross-sectional schematic view of a portion of a generator according to embodiments of the invention.

FIG. 2 shows a cross-sectional schematic view of portions of a generator 5, including a stator 20 and rotor 10 positioned within stator 20. The cross-sectional view of portions of rotor 10 includes a cross-sectional view of two groups of coils 120, one located above spindle 100, and one located below spindle 100. It is understood that the terms "above" and "below" are merely illustrative, and that groups of coils 120 may be located anywhere about spindle 100. As shown, rotor 10 may have spindle 100 and groups of coils 120 disposed about spindle 100. Spindle 100 may be formed of, for example, iron. Further, spindle 100 may include a plurality of teeth (not shown) extending radially outward toward stator 20. Each group of coils 120 may include plurality of ducts 110. Rotor 10 may also include subslot 140 extending between spindle 100 and group of coils 120. Subslot 140 may be in fluid communication with plurality of ducts 110. Subslot 140 may have at least one opening 102 which may allow for input of coolant 125. Further, rotor 10 may include a first baffle 150 disposed in subslot 140. First baffle 150 may direct a coolant 125 into at least one of plurality of ducts 110. When rotor 10 is rotated with respect to stator 20, an electrical current is created in groups of coils 120, generating electricity. This electricity may be used in a variety of applications including, for example, powering homes and/or buildings.

Generator 5 may have a middle portion 121 and two end portions 111. The terms "end portion" and "middle portion" may be used herein to refer to the end portions and middle portion of generator 5, rotor 10, stator 20, groups of coils 120 or subslot 140. Further, the term "end portions" generally refers to those portions of generator 10 closest to openings 102, while the term "middle portion" generally refers to the portion of generator 5 which is farther from openings 102 than end portions 111. End portions 111 do not encompass areas generally referred to as end-windings by those skilled in the art, but rather, are areas abutting the end-windings. End portions 111 and middle portion 121 may encompass larger or smaller portions of generator 5 than shown in the figures. The functions of generator 5, and specifically, subslot 140 and first baffle 150 of rotor 10, will be further explained with reference to FIG. 3.

Figure 3:
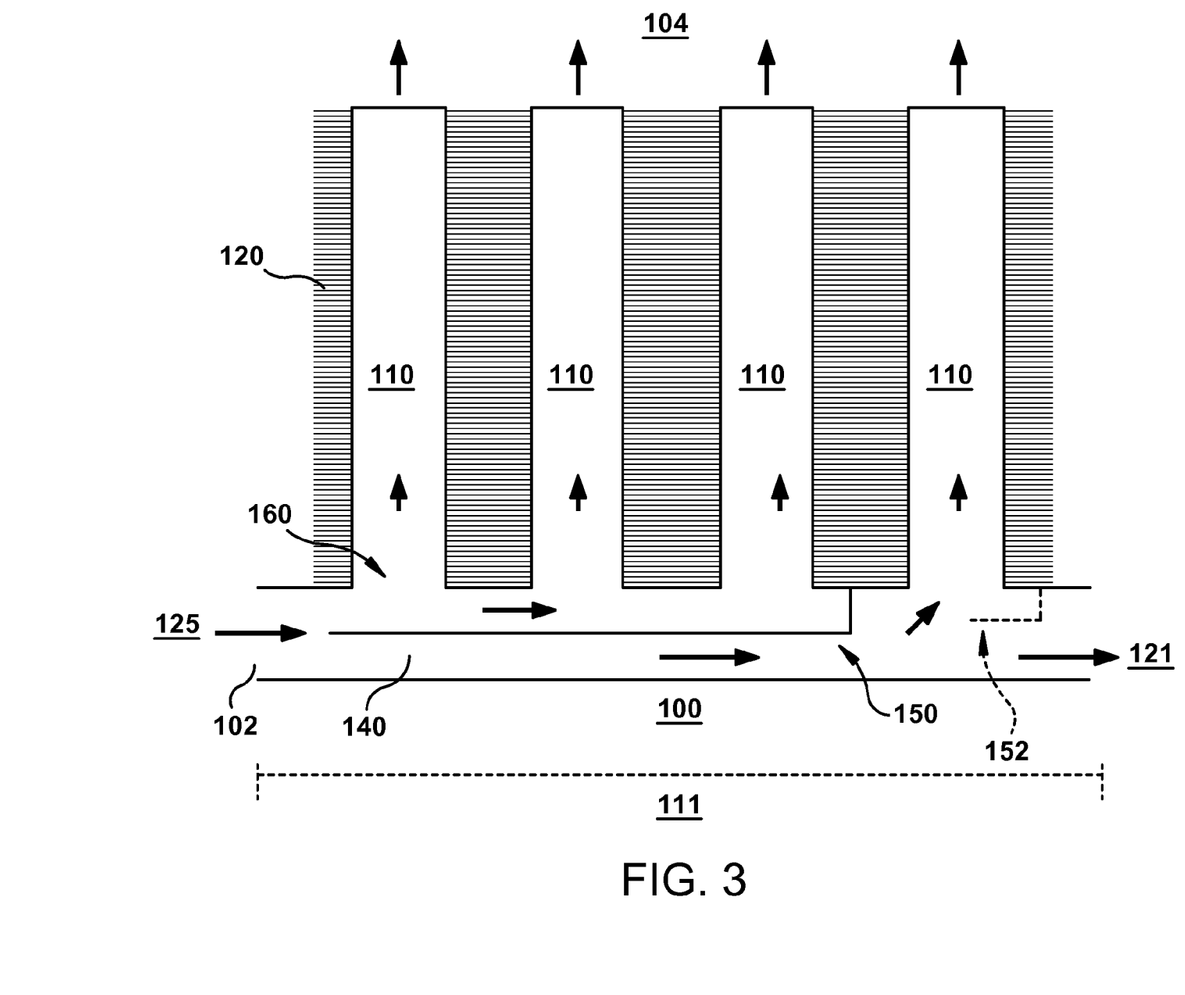
FIG. 3 shows a cross-sectional schematic view illustrating embodiments of the coil cooling baffles of FIG. 2.

FIG. 3 shows a close-up cross-sectional view of part of end portion 111 (FIG. 2). Specifically, FIG. 3 shows a close-up cross-sectional view of part of one group of coils 120 at end portion 111. End portion 111 may include a portion of spindle 100 and one group of coils 120 disposed about spindle 100, as well as subslot 140 and first baffle 150. As will be described herein, subslot 140 may be in fluid communication with plurality of ducts 110. First baffle 150 may be disposed in subslot 140. In one embodiment, first baffle 150 may include one or more substantially planar members. However, as will be described with reference to FIGS. 4A-D, first baffle 150 may include a plurality of members in a variety of arrangements. First baffle 150 may be formed of, for example, metals, plastics and/or composite materials. Also shown in FIG. 3 is an alternative embodiment in which a second baffle 152 (shown in phantom) is included in subslot 140. Second baffle 152 may be substantially identical in size, shape and/or material type to first baffle 150, or may be of a different size, shape and/or material type. Additionally, more than two baffles may be included in subslot 140.

Further, as shown by fluid flow arrows, plurality of ducts 110 may also be in fluid communication with an air gap 104. Air gap 104 may be any region outside of group of coils 120 that allows coolant to exit plurality of ducts 110. Air gap 104 may, for example, provide an inlet to a chimney (not shown). This chimney may allow for heated coolant to exit generator 5 (FIG. 2) and prevent decreased performance of generator 5.

FIG. 3 further shows flow arrows indicating flow of coolant 125 through end portion 111 and toward air gap 104. In practice, coolant 125 flows to air gap 104 via subslot 140 and plurality of ducts 110, thus transferring heat from group of coils 120 via plurality of ducts 110. Plurality of ducts 110 may be formed as apertures drilled into group of coils 120 which allows for transfer of heat from group of coils 120 to coolant 125. Where group of coils 120 include copper, plurality of ducts 110 may be formed by any conventional method for drilling through copper.

Coolant 125 may comprise, for example, ambient air or hydrogen. However, coolant 125 may take any gas form capable of carrying heat from group of coils 120 via plurality of ducts 110. Coolant 125 may be supplied from a reservoir or tower (not shown), and may flow through cavities (not shown) surrounding and/or running alongside group of coils 120. First baffle 150 allows more coolant 125 to flow through plurality of ducts 110 located at end portion 111 than to those located at middle portion 121. Where more coolant is supplied to plurality of ducts 110 located at end portion 111, more heat is transferred from group of coils 120 at end portion 111. This keeps group of coils 120 at end portion 111 cooler, and helps to avoid the effects of over-heating at end portion 111.

Figures 4A, 4B:
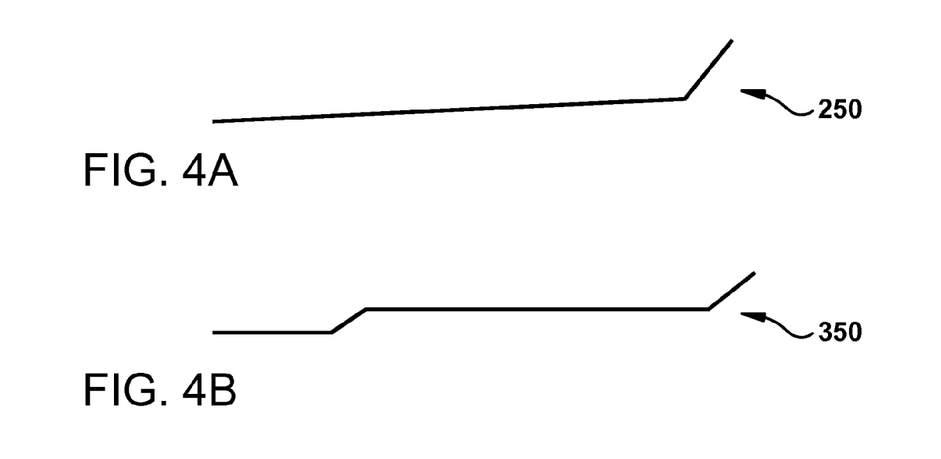
FIGS. 4A-4D show cross-sectional views of coil cooling baffles according to embodiments of the invention.
Figure 4C:
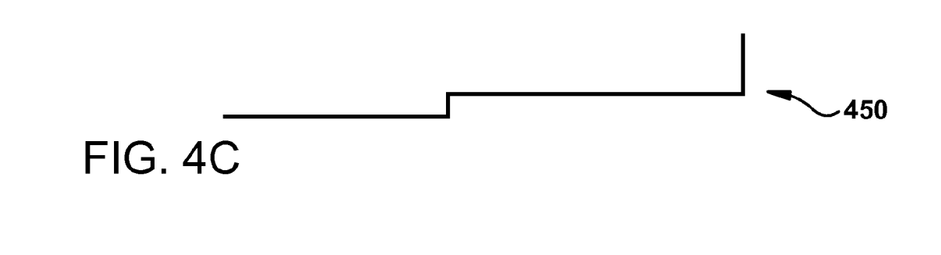
Figure 4D:
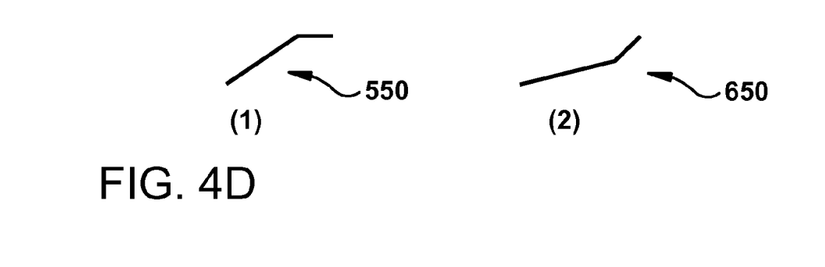

Turning to FIGS. 4A-4D, a plurality of baffle configurations are shown. FIGS. 4A-4C show different baffles 250, 350, 450 which may extend over a length of at least two of the plurality of ducts 110, similarly to first baffle 150 (FIG. 3). Baffles 250, 350 may include one or more substantially planar members, and/or may include additional members oriented at obtuse angles with the one or more substantially planar members. Further, baffle 450 may include a plurality of substantially planar members, each member oriented at substantially right angles to an adjacent member. FIG. 4D shows two smaller baffles 550, 650, which may be located adjacent one of plurality of openings 160 (FIG. 3). Baffles 550, 560 may be part of a group of baffles, any number of which may be located adjacent one of plurality of openings 160. Baffles 250, 350, 450, 550, 650 may be disposed within subslot 140. Baffles 250, 350, 450, 550, 650 may be operably connected to group of coils 120 or attached to spindle 100.

Figure 5:
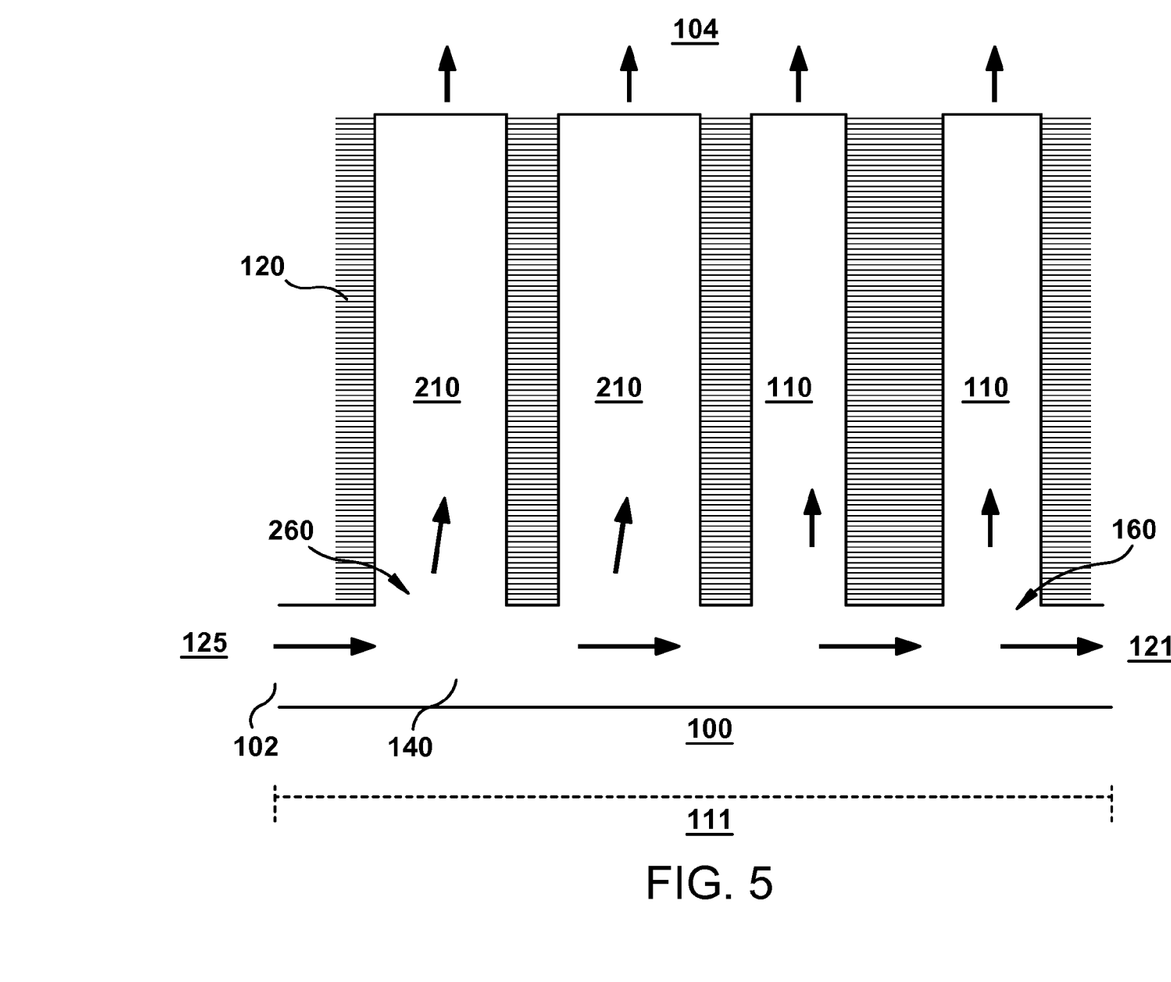
FIGS. 5-8 show cross-sectional schematic views illustrating embodiments of obstructing fluid flow according to embodiments of the invention.

FIG. 5 shows a close-up cross-sectional view of an alternative embodiment. In this case, baffle 150 has been removed, and some of plurality of ducts 110 have been replaced with larger ducts 210. Larger ducts 210 may function substantially similarly to plurality of ducts 110, but may have larger openings 260 and greater volume capacity. Larger ducts 210 consume more of coolant 125 than plurality of ducts 110 due to these larger openings 260 and greater volume capacity. Where more coolant is supplied to larger ducts 210 located at end portion 111, more heat is transferred from group of coils 120 at end portion 111. This keeps group of coils 120 at end portion 111 cooler, and helps to avoid the effects of over-heating at end portion 111.

Figure 6:
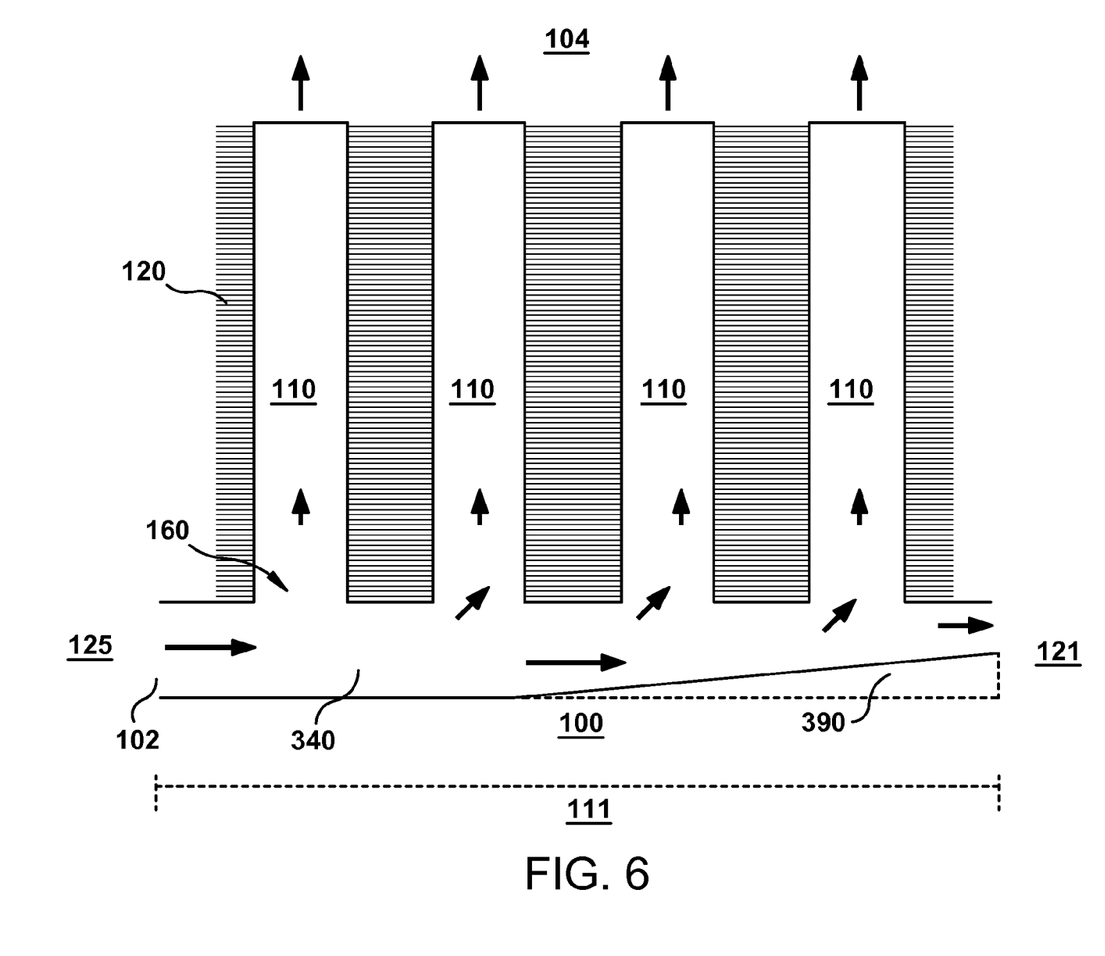

FIG. 6 shows a close-up cross-sectional view of another alternative embodiment. In this case, baffle 150 has been removed, and tapered subslot 340 is substantially tapered from end portion 111 to middle portion 121. Tapered subslot 340 may be constructed such that spindle 100 tapers from end portion 111 toward middle portion 121. In this case, spindle 100 may be manufactured or modified to create tapered subslot 340, such that spindle 100 has a larger diameter at middle portion 121 than at end portions 111. Further, spindle 100 may be manufactured or modified in a variety of forms capable of obstructing flow of coolant 125. Alternatively, tapered subslot 340 may be constructed of multiple members, which when combined, may provide for substantial tapering from end portion 111 to middle portion 121. For example, wedge baffle 390 (shown in phantom) may be disposed in subslot 340 to provide for tapering and obstruction of the flow of coolant 125 toward middle portion 121. Wedge baffle 390 is shown as a wedge-shaped attachment, however, wedge baffle 390 may take a variety of forms capable of obstructing flow of coolant 125. Wedge baffle 390 may be attached to spindle 100 (as shown in phantom), or alternatively, may be attached to group of coils 120. In any case, tapered subslot 340 will cause a greater quantity of coolant 125 to flow through plurality of ducts 110. Where more coolant is supplied to plurality of ducts 110 located at end portion 111, more heat is transferred from group of coils 120 at end portion 111. This keeps portions of group of coils 120 at end portion 111 cooler, and helps to avoid the effects of over-heating at end portion 111.

Figure 7:
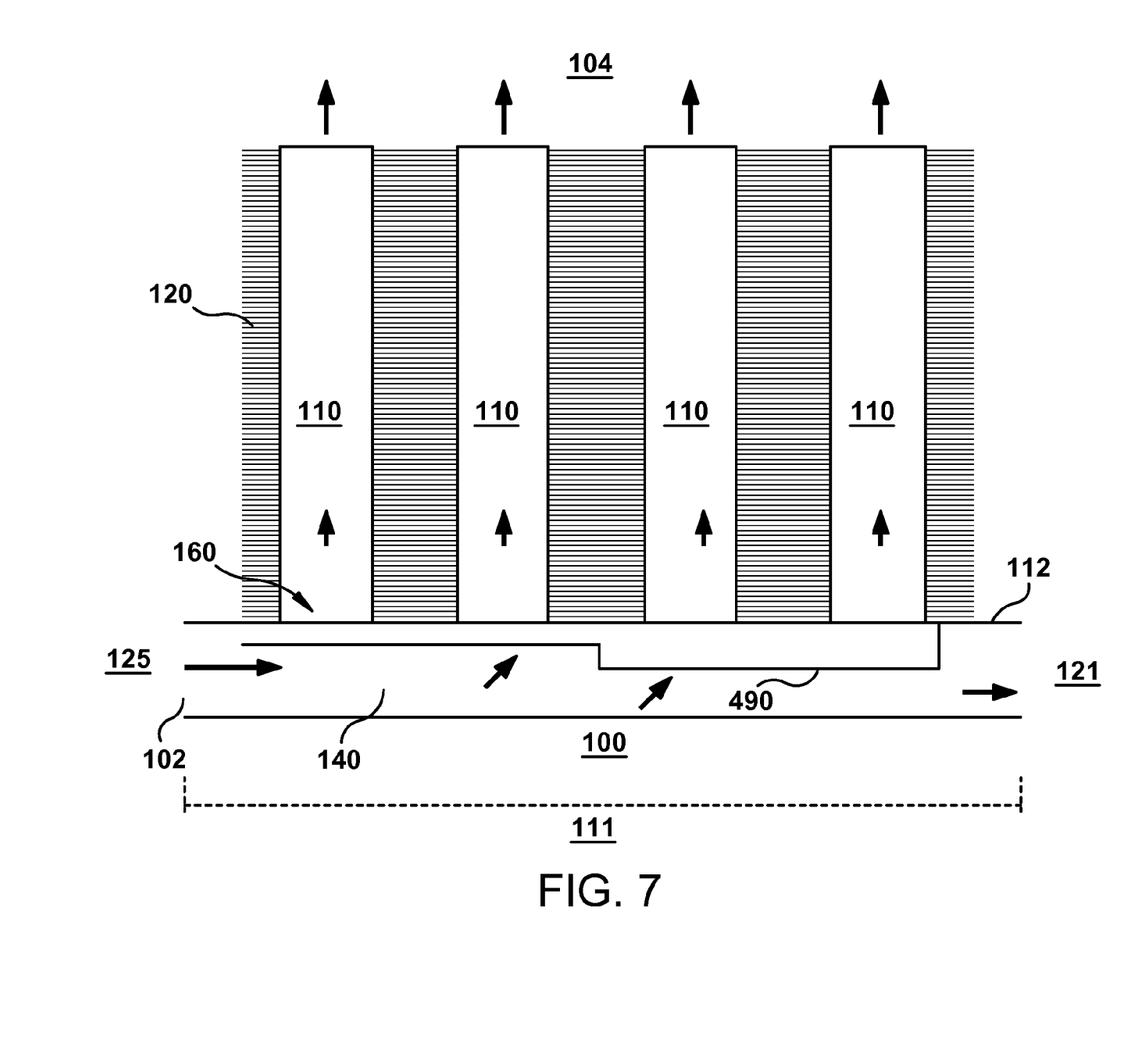

FIG. 7 shows a close-up cross-sectional view of another alternative embodiment. In this case, subslot cover 490 may act similarly to wedge baffle 390 of FIG. 6. However, subslot cover 490 of FIG. 7 may be located closer to group of coils 120. Subslot cover 490 is shown as a stepped cover, however, it may take a variety of forms. Further, subslot cover 490 may be formed of one or a plurality of members. For example, subslot cover 490 may contain one or more substantially angled members or one or more substantially rounded members. Subslot cover 490 may be disposed in subslot 140 during a portion of rotor assembly. For example, subslot cover 490 may be inserted into subslot 140 after spindle 100, and group of coils 120 have been separated from one another. Subslot cover 490 may be independently movable and may obstruct a portion of subslot 140. Subslot cover 490 may be placed in different portions of end portion 111 of subslot 140. In any case, subslot cover 490 causes a greater quantity of coolant 125 to flow through plurality of ducts 110 located at end portion 111. Where more coolant is supplied to plurality of ducts 110 located at end portion 111, more heat is transferred from group of coils 120 at end portion 111. This keeps portions of group of coils 120 at end portion 111 cooler, and helps to avoid the effects of over-heating at end portion 111.

Figure 8:
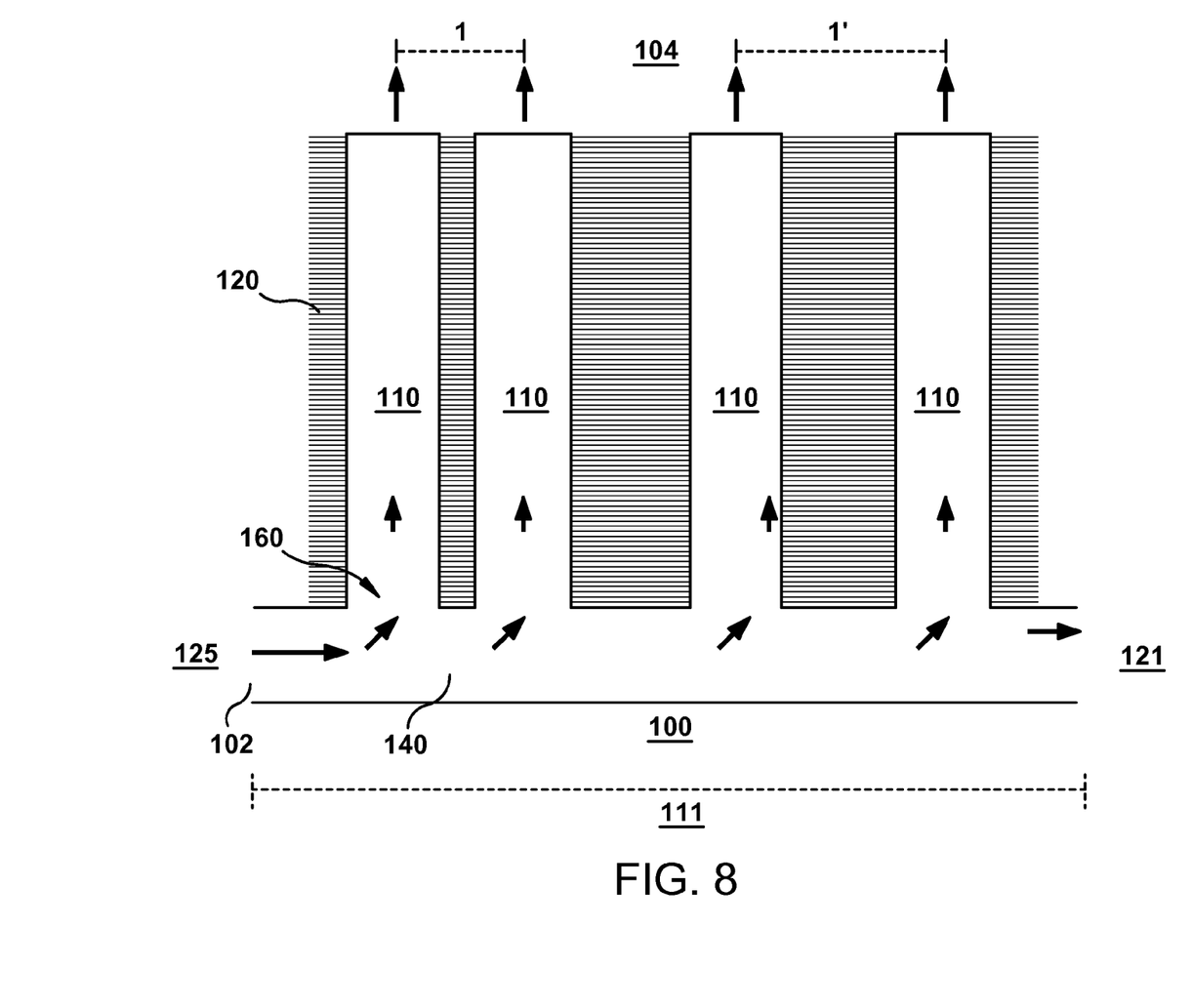

FIG. 8 shows a close-up cross-sectional view of another alternative embodiment. In this case, the pitch (1) between plurality of ducts 110 may vary such that a portion of plurality of ducts 110 located near end portion 111 may have a smaller pitch than those located near middle portion 121. As is known in the art, the term "pitch" may refer to a linear distance between two similar openings. In this case, pitch 1 and pitch 1' illustrate different linear distances between two sets of openings 160. Similarly to embodiments discussed with respect to FIG. 3, a smaller pitch between plurality of ducts 110 located near end portion 111 provides greater cooling to end portion 111. This is possible because a greater total cross-sectional area is available for flow of coolant 125 near end portion 111. Where pitch 1 is smaller than pitch 1', a greater number of plurality of ducts 110 are located near end portion 111. While this may not provide greater flow of coolant 125 through each of plurality of ducts 110, it provides for a greater total quantity of coolant 125 flowing through end portion 111. Where the total quantity of coolant 125 supplied to plurality of ducts 110 located at end portion 111 increases, more heat is transferred from group of coils 120 at end portion 111. This keeps portions of group of coils 120 at end portion 111 cooler, and helps to avoid the effects of over-heating at end portion 111.

While several aspects of the invention are shown and described herein with reference to one group of coils 120 and one subslot 140, it is understood that these aspects may apply to more than one subslot 140 and more than one group of coils 120 disposed about spindle 100. Further, combinations and variations of aspects of the invention may be used in different groups of coils 120 and subslots 140 disposed about the same spindle 100. For example, one group of coils 120 disposed about spindle 100 may increase coolant flow through plurality of ducts 110 using a first baffle 150 in subslot 140, while another group of coils 120 disposed about spindle 100 may increase coolant flow through plurality of ducts 110 using varied pitches between plurality of ducts 110. This example is merely illustrative, and it is understood that aspects of the invention may be combined and interchanged in a variety of manners.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dynamoelectric machine comprising:
    a stator;
    a rotor positioned within the stator, the rotor having:
        a spindle;
        groups of coils disposed about the spindle, each of the groups of coils including a plurality of ducts;
        a plurality of subslots disposed about the spindle, each of the plurality of subslots extending between the spindle and one of the groups of coils, wherein each of the plurality of subslots is in fluid communication with the one of the groups of coils; and
        a first baffle disposed in one of the plurality of subslots for directing a coolant into at least one of the plurality of ducts, the first baffle including a first portion extending at least partially axially within the one of the plurality of subslots.

2. The dynamoelectric machine of claim 1, wherein the first baffle comprises a substantially planar member.

3. The dynamoelectric machine of claim 2, wherein the first baffle further comprises at least one member oriented at an obtuse angle with the substantially planar member.

4. The dynamoelectric machine of claim 1, wherein the first baffle is operably connected to the group of coils.

5. The dynamoelectric machine of claim 4, wherein a portion of the first baffle is oriented at an obtuse angle with the group of coils.

6. The dynamoelectric machine of claim 1, wherein the first baffle further includes a second portion extending at least partially radially from the first portion, the first portion having a greater length than the second portion.

7. The dynamoelectric machine of claim 1, wherein the first baffle is located adjacent to one of the plurality of ducts.

8. The dynamoelectric machine of claim 7, further comprising a second baffle located adjacent to a second one of the plurality of ducts.

9. The dynamoelectric machine of claim 1, wherein the subslot has a middle portion and two end portions, and wherein the subslot is substantially tapered from the two end portions to the middle portion.

10. The dynamoelectric machine of claim 1, wherein the first baffle extends over an axial length of at least two of the plurality of ducts.

11. A rotor comprising:
    a spindle;
    groups of coils disposed about the spindle, each of the groups of coils including a plurality of ducts;
    a plurality of subslots disposed about the spindle, each of the plurality of subslots extending between the spindle and one of the groups of coils, wherein each of the plurality of subslots is in fluid communication with the one of the groups of coils; and
    a first baffle disposed in one of the plurality of subslots for directing a coolant into at least one of the plurality of ducts, the first baffle including a first portion extending at least partially axially within the one of the plurality of subslots.

12. The rotor of claim 11, wherein the subslot has a middle portion and two end portions, and wherein the first baffle is located at approximately one of the end portions.

13. The rotor of claim 12, wherein the subslot is substantially tapered from the two end portions to the middle portion.

14. The rotor of claim 11, wherein the plurality of ducts include groups of differently-sized ducts, wherein a group of ducts located near an end portion of the subslot are larger than a group of ducts located near a middle portion of the subslot.

15. The rotor of claim 11, wherein the plurality of ducts include groups of ducts, each group of ducts having a different pitch between ducts.

16. The rotor of claim 11, wherein the first baffle includes a subslot cover that is independently movable and obstructs a portion of the subslot.

17. The rotor of claim 16, wherein the subslot cover has a middle portion and an end portion, the middle portion and the end portion corresponding to a middle portion and an end portion of the subslot, wherein the subslot cover obstructs a greater amount of the subslot at the end portion of the subslot than at the middle portion of the subslot.

18. The rotor of claim 11, wherein the first baffle is located adjacent to one of the plurality of ducts.

19. The rotor of claim 11, wherein the first baffle is connected to one of: the group of coils or the spindle.

20. The rotor of claim 11, wherein the first baffle extends over a length of at least two of the plurality of ducts.

* * * * *